(12) United States Patent
Werjefelt

(10) Patent No.: US 11,440,661 B2
(45) Date of Patent: Sep. 13, 2022

(54) EMERGENCY VISION DEVICE USING SPRING WIRE LOOPS

(71) Applicant: Alexander K. Werjefelt, Kamuela, HI (US)

(72) Inventor: Alexander K. Werjefelt, Kamuela, HI (US)

( * ) Notice: Subject to any disclaimer, the term of this patent is extended or adjusted under 35 U.S.C. 154(b) by 1028 days.

(21) Appl. No.: 16/138,191

(22) Filed: Sep. 21, 2018

(65) Prior Publication Data

US 2019/0100316 A1 Apr. 4, 2019

Related U.S. Application Data

(60) Provisional application No. 62/568,043, filed on Oct. 4, 2017.

(51) Int. Cl.
| | | |
|---|---|---|
| *B64D 11/00* | (2006.01) | |
| *B60R 1/00* | (2022.01) | |
| *A62B 99/00* | (2009.01) | |
| *B64D 25/00* | (2006.01) | |

(52) U.S. Cl.
CPC ............. *B64D 11/00* (2013.01); *A62B 99/00* (2013.01); *B60R 1/00* (2013.01); *B64D 25/00* (2013.01); *B64D 2231/025* (2013.01)

(58) Field of Classification Search
CPC .. B64D 11/00; B64D 25/00; B64D 2231/025; B64D 45/00; A62B 99/00; B60R 1/00; B64C 1/14
See application file for complete search history.

(56) References Cited

U.S. PATENT DOCUMENTS

| | | | | |
|---|---|---|---|---|
| 2,600,501 A | * | 6/1952 | Higgs .................... | A62B 31/00 |
| | | | | 5/98.1 |
| 2,639,819 A | * | 5/1953 | Marks .................... | A47B 43/04 |
| | | | | 211/186 |
| 3,619,042 A | | 11/1971 | Lazar | |
| 4,832,287 A | | 5/1989 | Werjefelt | |
| 5,038,812 A | * | 8/1991 | Norman ................. | E04H 15/40 |
| | | | | 135/905 |
| 5,202,796 A | | 4/1993 | Werjefelt | |
| 5,301,705 A | * | 4/1994 | Zheng .................... | E04H 15/14 |
| | | | | 135/125 |
| 5,318,250 A | | 6/1994 | Werjefelt | |
| 5,358,440 A | * | 10/1994 | Zheng .................... | A63H 33/18 |
| | | | | 446/487 |

(Continued)

FOREIGN PATENT DOCUMENTS

| | | |
|---|---|---|
| WO | WO 98/19917 | 5/1998 |
| WO | WO 2009/137050 A1 | 11/2009 |

OTHER PUBLICATIONS

European Search Report dated Oct. 15, 2020 for 18865145.9.

(Continued)

*Primary Examiner* — Valentina Xavier
(74) *Attorney, Agent, or Firm* — Shiesinger, Arkwright & Garvey LLP

(57) ABSTRACT

An emergency vision device includes an enclosed housing having a first end and a second end; first and second clear members disposed at the first and second ends, respectively; the housing including a plurality of wall panels joined side-to-side, the wall panels being foldable; and a loop of spring wire is operably associated with each of at least two of the wall panels.

22 Claims, 11 Drawing Sheets

(56) References Cited

U.S. PATENT DOCUMENTS

| | | | |
|---|---|---|---|
| 5,947,415 A | 9/1999 | Werjefelt | |
| 5,964,533 A * | 10/1999 | Ziglar | D06F 95/002 220/9.3 |
| 6,357,510 B1 * | 3/2002 | Zheng | G09F 15/0025 160/354 |
| 6,460,538 B1 | 10/2002 | Kemp | |
| 6,460,804 B2 * | 10/2002 | Werjefelt | G02B 7/007 359/896 |
| 6,527,136 B1 | 3/2003 | Sabounjian | |
| 6,612,453 B2 * | 9/2003 | Joo-Tai | A45C 7/0077 220/9.2 |
| 6,694,994 B1 * | 2/2004 | Zheng | A63H 33/008 135/117 |
| 6,783,016 B2 * | 8/2004 | Wang | A42B 1/006 383/4 |
| 7,163,340 B2 * | 1/2007 | Godshaw | B25H 3/00 383/41 |
| 7,583,455 B2 | 9/2009 | Werjefelt | |
| 7,597,208 B2 * | 10/2009 | Wang | B65D 37/00 220/531 |
| 8,213,101 B2 | 7/2012 | Werjefelt | |
| 8,411,382 B2 * | 4/2013 | Werjefelt | A62B 3/00 359/894 |
| 2009/0279196 A1 | 11/2009 | Werjefelt | |
| 2012/0292313 A1 | 11/2012 | Erlich | |
| 2013/0107388 A1 | 5/2013 | Werjefelt | |
| 2013/0308260 A1 | 11/2013 | Stevenson | |
| 2017/0235149 A1 | 8/2017 | Werjefelt et al. | |

OTHER PUBLICATIONS

ISA/U.S. International Search Report and the Written Opinion of the International Search Authority, PCT/US2018/052343, dated Nov. 26, 2018.

\* cited by examiner

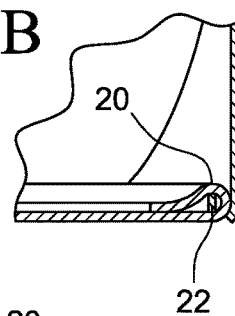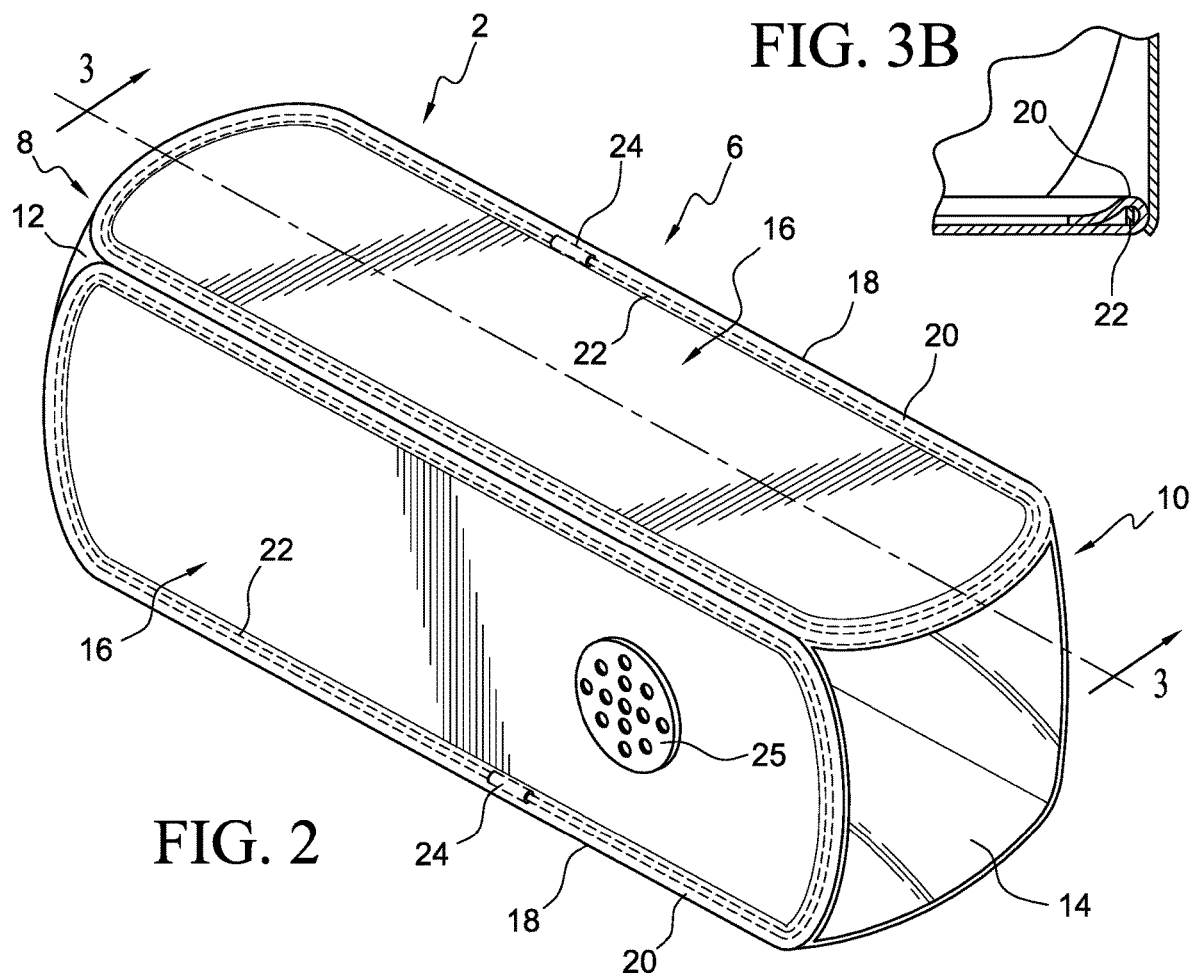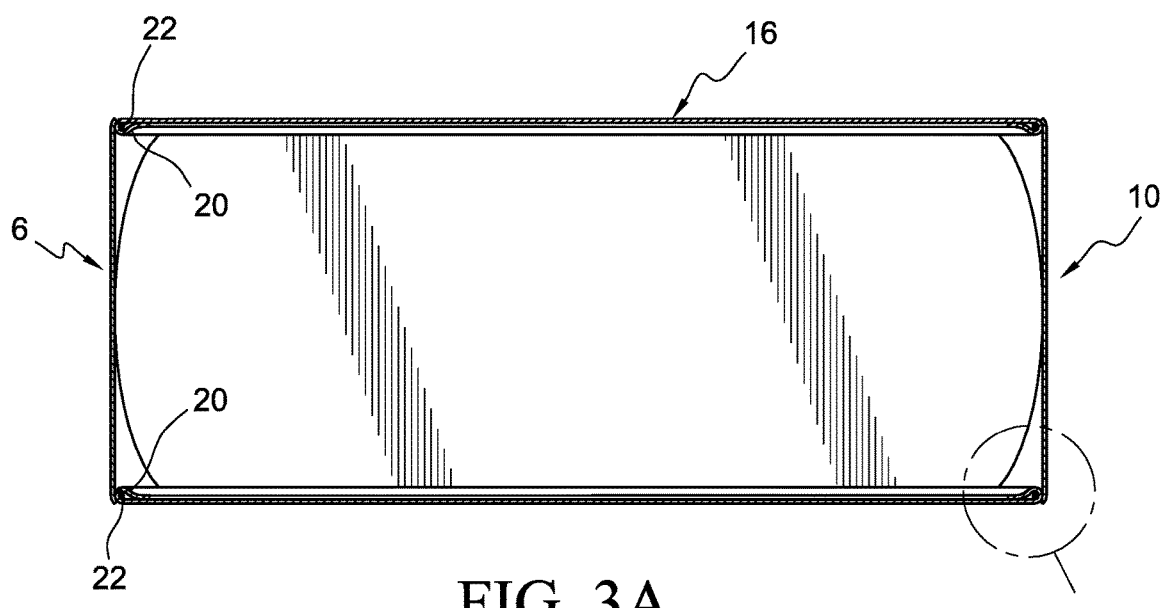

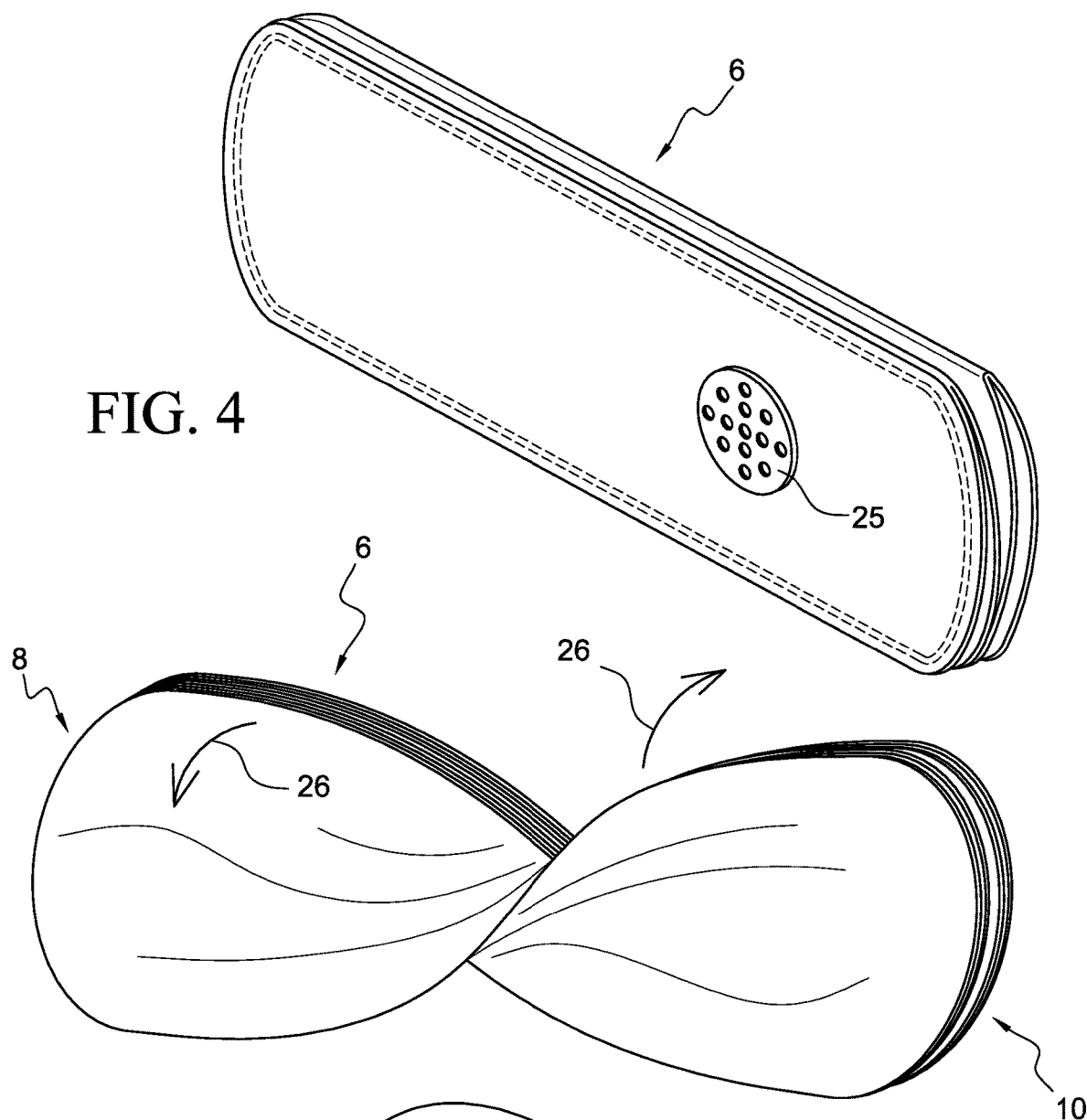
FIG. 4
FIG. 5
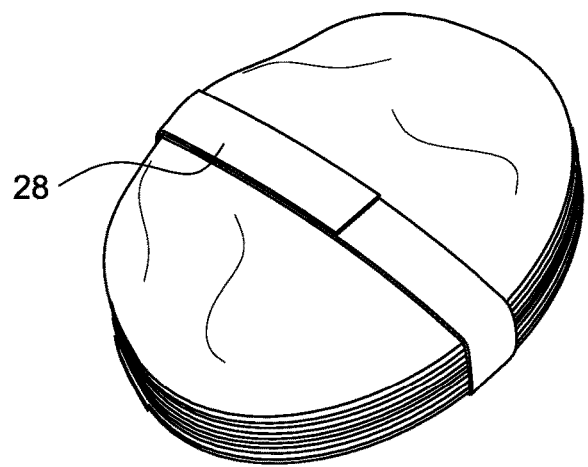
FIG. 6

US 11,440,661 B2

EMERGENCY VISION DEVICE USING SPRING WIRE LOOPS

RELATED APPLICATION

This is a nonprovisional application, claiming the priority benefit of Provisional Application Ser. No. 62/568,043, filed Oct. 4, 2017, herein incorporated by reference.

FIELD OF THE INVENTION

The present invention relates generally to a device to enable an operator to maintain visual contact with instruments or other visual sources of data after smoke and/or particulate from a fire or other sources has invaded the operator's environment.

BACKGROUND OF THE INVENTION

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5,318,250; 5,202,796; and 5,947,415, all issued to Bertil Werjefelt.

The devices disclosed in the above-cited patents provide the primary means for providing an operator clear visibility to the instruments or sources of data during emergency smoke conditions. Generally, these devices require a pump or source of pressurized gas to inflate and deploy the devices. Some of the devices are generally designed for specific cockpit configurations so that once they are deployed, they are not typically movable around the cockpit. Consequently, the operator may not be able to view other sources of data which the operator may need to see but is not in the line of sight provided by the devices.

SUMMARY OF THE INVENTION

The present invention provides an emergency vision device, comprising an enclosed housing having a first end and a second end; first and second clear members disposed at the first and second ends, respectively; the housing including a plurality of wall panels joined side-to-side, the wall panels being foldable; and a loop of spring wire is operably associated with each of at least two of the wall panels.

The present invention also provides an emergency vision device, comprising an enclosed housing having a first front end, a second front end and rear end; first and second clear members disposed at the first and second front ends, respectively, and a third clear member disposed at the rear end; the housing including a first section operably associated with the first and third clear member to allow the user to see outside through a windshield; the housing including a second section operably associated with the second and third clear members to allow the user to view an instrument panel; the first section and the second section each including a plurality of wall panels joined side-to-side; and a loop of spring wire is operably associated with each of at least two of the wall panels of the respective first section and the second section.

BRIEF DESCRIPTION OF THE DRAWINGS

FIG. 2 is rear perspective view of the hand-held emergency vision device shown in FIG. 1.

FIG. 3A is a cross-sectional view taken along line 3-3 in FIG. 2. FIG. 3B is an enlarged view of a portion taken from FIG. 3A.

FIGS. 4-6 show the folding sequence of the hand-held emergency vision device shown in FIG. 2.

DETAILED DESCRIPTION OF THE INVENTION

Figure 1:
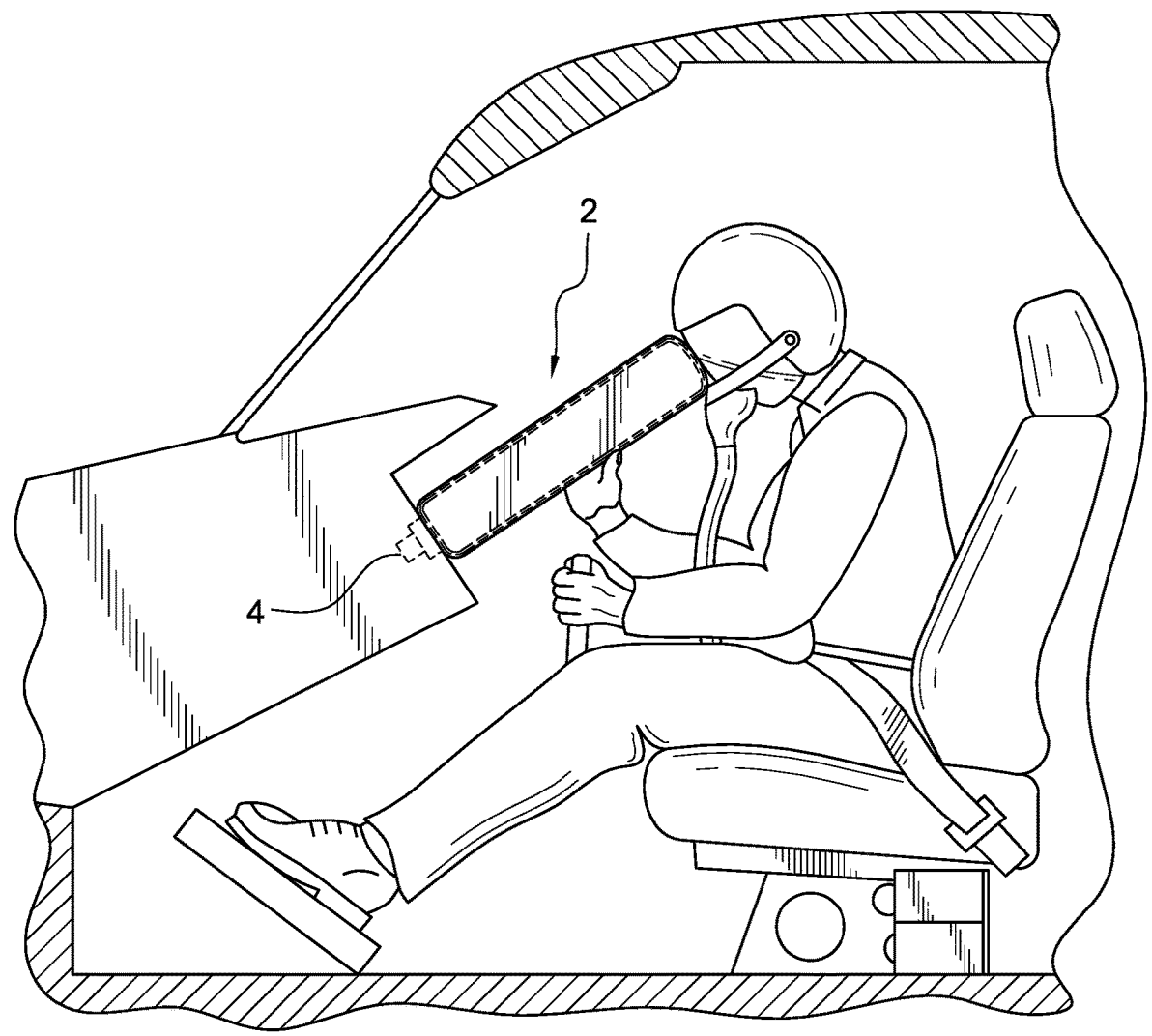
FIG. 1 is a schematic side elevational view of a cockpit showing a pilot using a hand-held emergency vision device embodying the present invention.

Referring to FIG. 1, a hand-held emergency vision device 2 is shown being used by a pilot during a smoke emergency to allow the pilot to see an instrument panel 4. The device 2 bridges the gap between the pilot and the instrument panel with a clear viewing path to the windshield and/or the instrument panel while the cockpit is filled with vision degrading smoke, thereby providing pilot with vital information for guiding the aircraft to a safe landing after smoke and/or particulate matter invades the cockpit area. The device 2 is movable to other areas of the instrument panel or cockpit to direct the device 2 to wherever the pilot needs to view, such as switches, gauges, etc.

Referring to FIGS. 2 and 3, the device 2 comprises an enclosed, preferably tubular housing 6 with a front end 8 and a rear end 10 provided with clear (transparent) members 12 and 14, respectively. The device 2 is completely enclosed to contain clear air inside the housing 6 to allow the user to see through the distance between the clear members 8 and 10 to view a source of information at the distal end of the housing.

The housing 6 comprises a number of longitudinal wall panels 16 joined together side-to-side. Each panel 16 is made of foldable material, preferably translucent or clear (transparent), to allow the device to be folded form when not in use. The wall panels 16 when made with clear material will advantageously allow light inside the housing 6 to aid in viewing the instrument panel or other sources of information needed by the operator. The foldable material may be made of Nylon, plastic or other suitable foldable material that is air-tight that will hold air inside the housing 6 and a good barrier to smoke particles to keep smoke out.

Each wall panel 16 has a peripheral edge 18 with a sleeve 20. A flat spring wire 22 (shown in cross-section in FIG. 3B) is disposed inside the sleeve 20. The spring wire 22 is joined end-to-end with a coupling 24, or by welding or other standard connector to make the spring wire 22 into a continuous loop inside the sleeve 20. Potential energy is stored in the spring wire 22 when turned into a loop. The tendency of the loop to expand outwardly to return to its original straight line due to its stored energy when bent into a loop makes the wall panel 16 self-supporting in the flat configuration. The spring 22 will pull and stretch the material of the wall panel 16 outwardly. The spring wire 22 must be of relatively small cross-section to allow the twisting and folding of the wall panels 16. The spring wire 22 may be of other cross-sectional shapes, such as round, square, etc.

Although the device 2 is disclosed with each of the wall panels 16 being equipped with a loop of spring wire 22, a minimum of two wall panels 16, adjacent to each other, may be provided with the loops of spring wire 22. Once the device 2 is expanded, the air inside the housing 6 and the two spring wires 22 will provide enough support and rigidity to the housing 6. Using only two loops of the spring wire 22 will advantageously make folding of the device 2 much easier.

Figure 12:
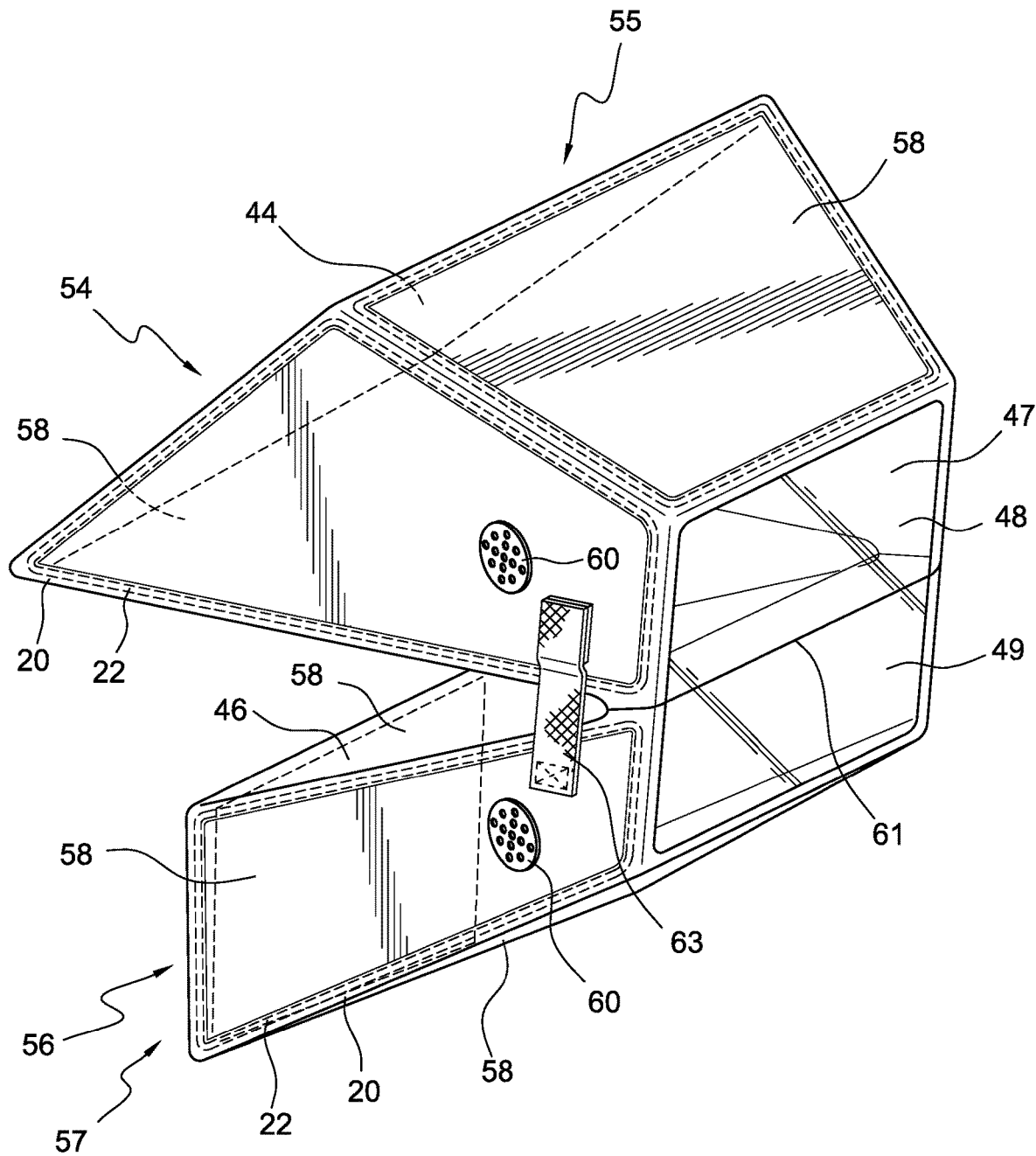
FIG. 12 is rear perspective of the emergency vision device shown in FIG. 11.

Although the housing 6 is disclosed as being hand-held and tubular, the housing 6 can have the shape of windshield unit 55 or the instrument panel unit 57 and held fixedly in place during use, as shown in FIG. 12.

The clear members 12 and 14 may be made of foldable clear plastic sheet material attached to the wall panels 16.

A filter 25 is disposed on one of the wall panels 16. The filter 25 allows the ambient air to enter the housing 6 when the device is expanded from the compact form but filters out the particulate matter in the smoke. The wall panels 16 are made of air-tight material to keep the air in and keep particulate matter in the smoke from entering the housing 6.

Referring to FIGS. 4-6, the device 2 may be folded by bringing two adjacent wall panels 16 into the other adjacent wall panels, thereby flattening the tubular housing 6 as shown in FIG. 4. The flattened tubular housing 6 is then twisted into two or three overlapping loops or circles, as generally indicated by the arrows 26 and then bringing the ends toward each other to a flattened compact form, as shown in FIG. 6. A strap 28 holds the compact form in place.

To expand, the strap 28 is removed, allowing the individual spring wires 22 to revert to a single loop. Air is drawn through the filter 25 to equalize the pressure between the interior space of the housing 6 and the outside. The filter 25 advantageously filters out the smoke particulates, thus providing clear air inside the housing 6. More than one filter 25 may be used, disposed on the same or other wall panels 16 or the clear members 12 and 14, if needed, to aid in the expansion of the housing 6 from the compact form.

Figure 7:
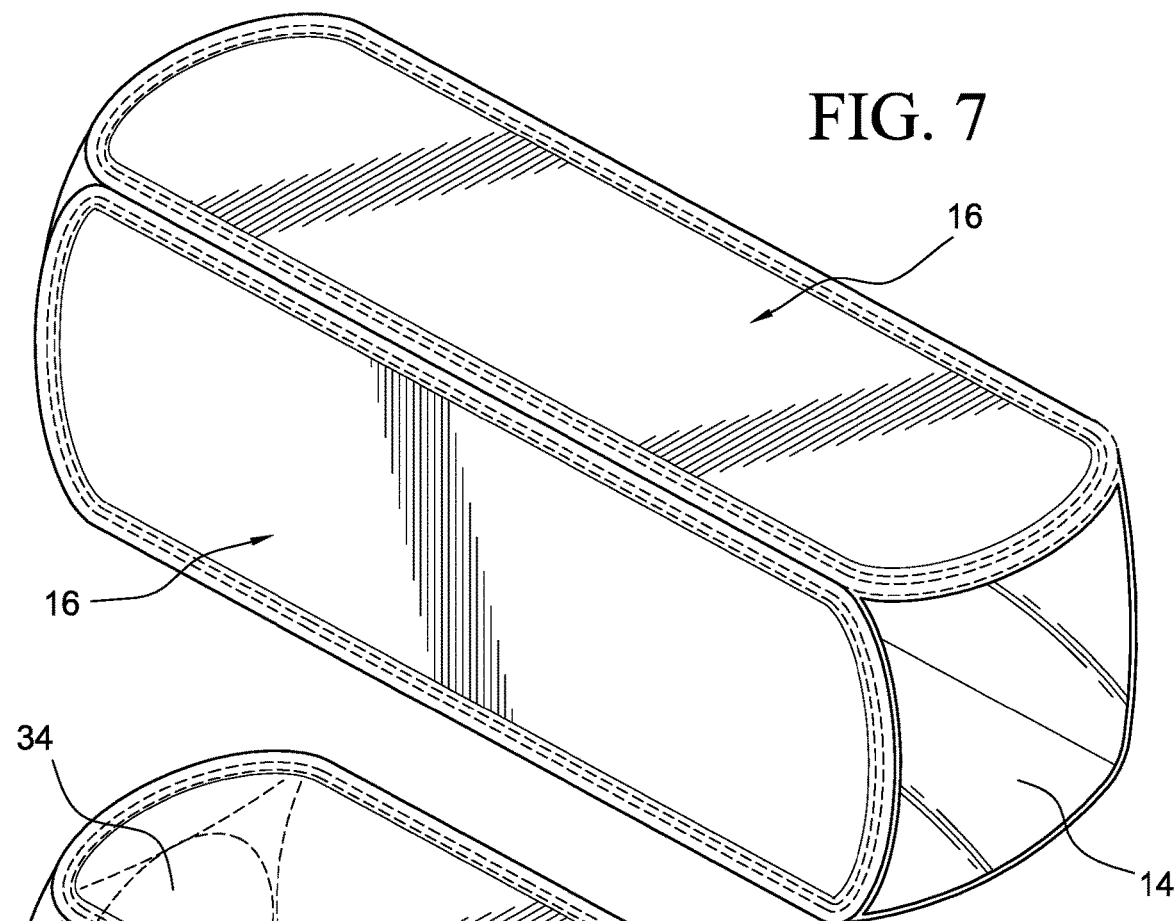
FIG. 7 is a perspective view of the hand-held emergency vision device using a filter fabric material for the wall panels.

Referring to FIG. 7, one of more of the wall panels 16 may be made of filter fabric material, instead of using an individual cartridge for the filter 25. The filter fabric material advantageously allows air to pass through but blocks particulate matter in the smoke from entering the interior of the housing 6. The use of filter fabric material for the wall panels 16 advantageously makes the housing 6 more compact since the filter cartridge adds some extra thickness to the housing when folded.

Figure 13:
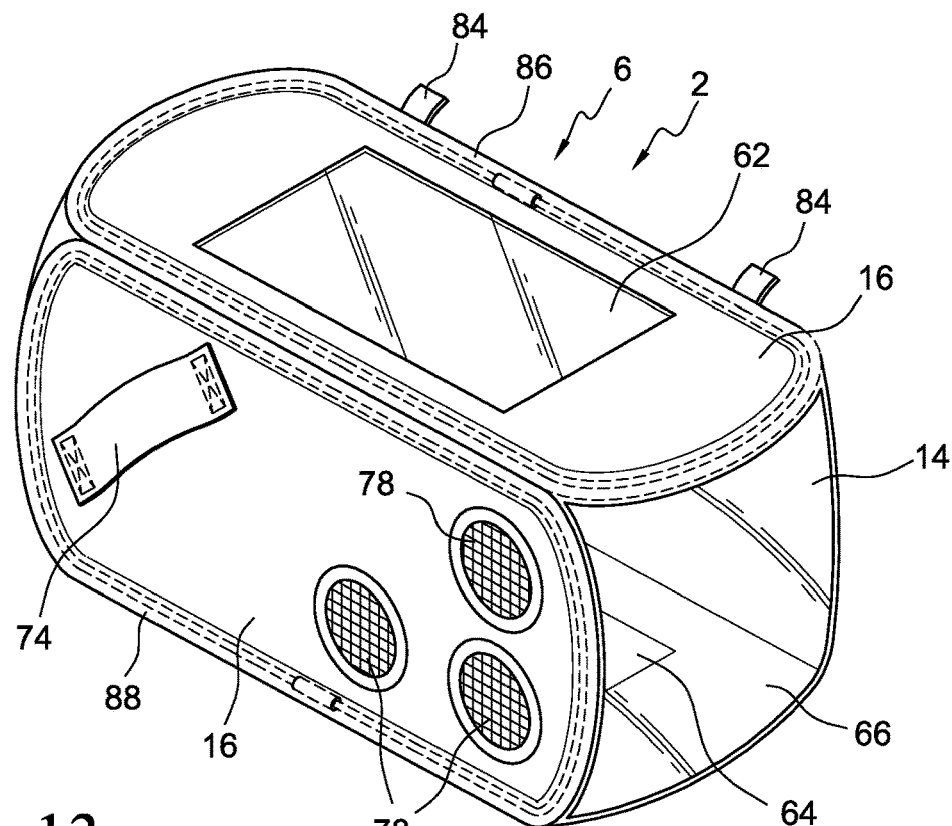
FIGS. 13 and 14 are perspective views of a modified version of the hand-held device shown in FIG. 2.
Figure 14:
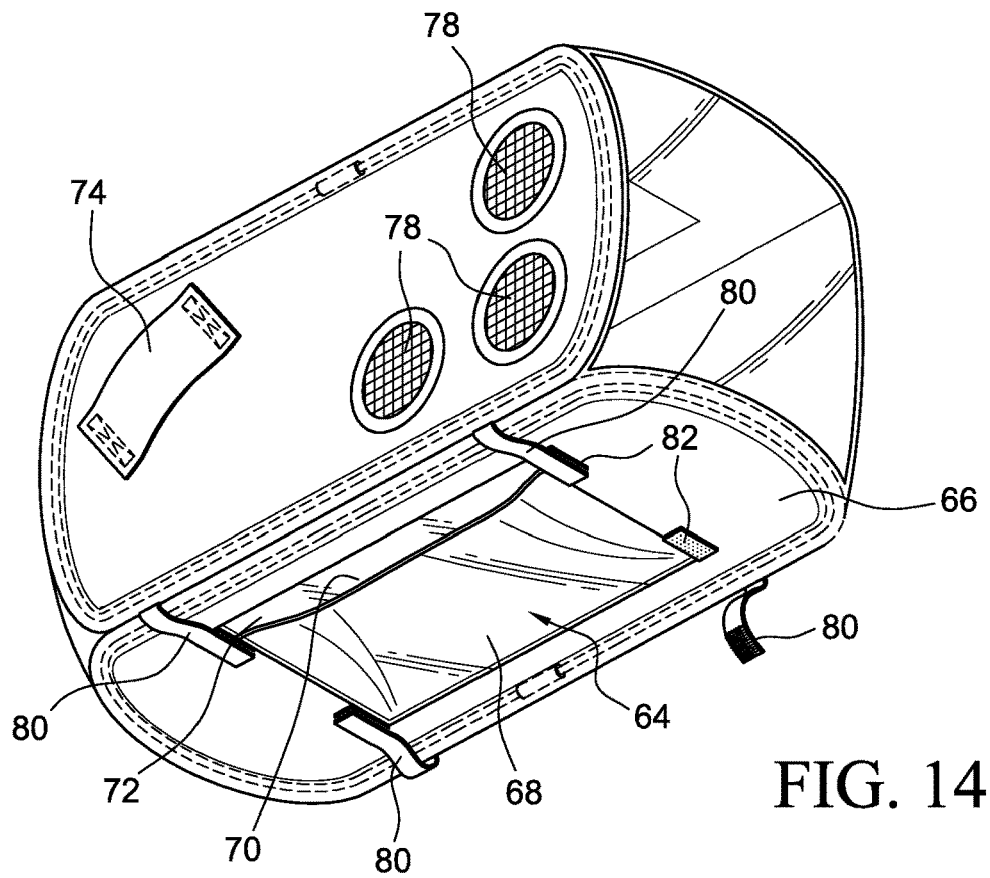

Instead of the entire wall panel 16 being made of filter fabric material, only a portion of the wall panel may be made of the filter fabric material, as shown in FIGS. 13 and 14.

Figure 8:
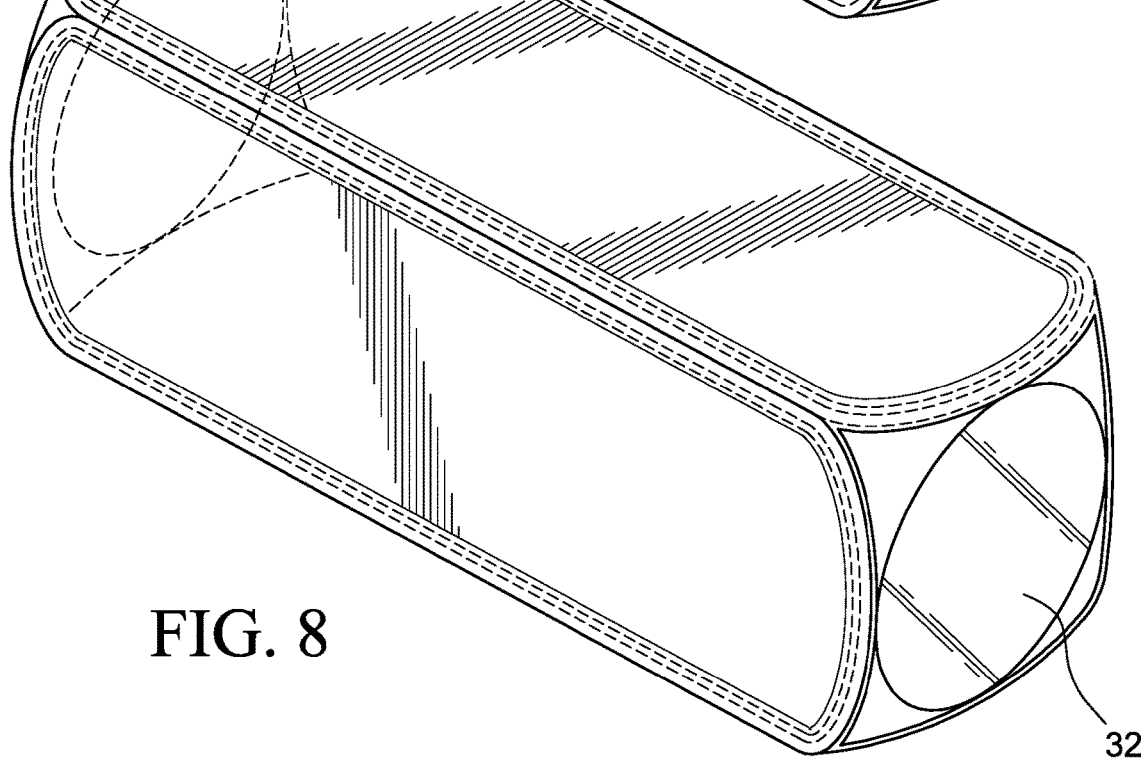
FIG. 8 is perspective view of the hand-held emergency vision device using rigid clear members at the front and rear ends of the device.

Referring to FIG. 8, the clear members 12 and 14 at the front end 8 and the rear end 10 of the housing 6 may be made of rigid clear plastic members 32 and 34.

Figure 9:
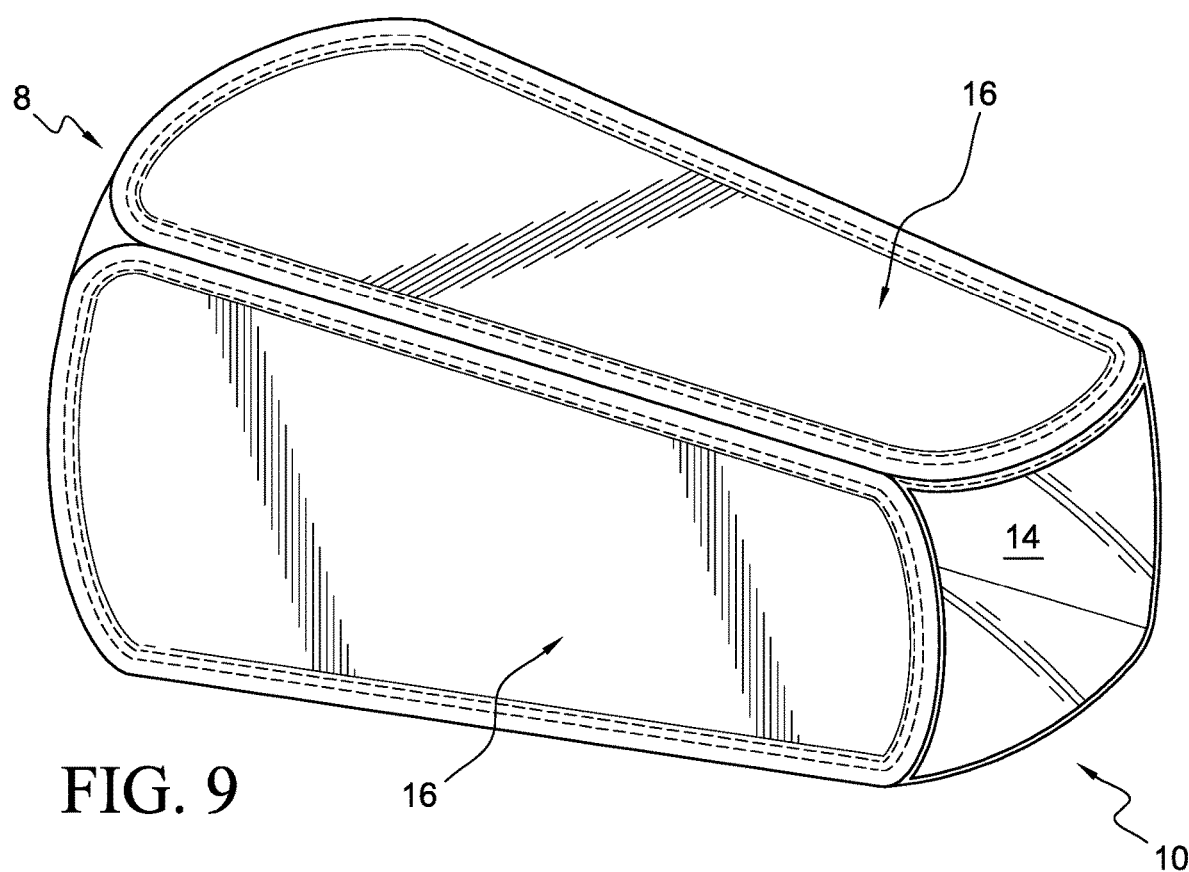
FIG. 9 is a perspective view of the hand-held emergency vision device showing a tapered housing.

Referring to FIG. 9, the housing 6 may be tapered, tapering from narrow to wide from the rear end 10 to the front end 8. Each of the wall panels 16 are tapered to provide the overall tapered shaped for the housing 6.

Figure 10:
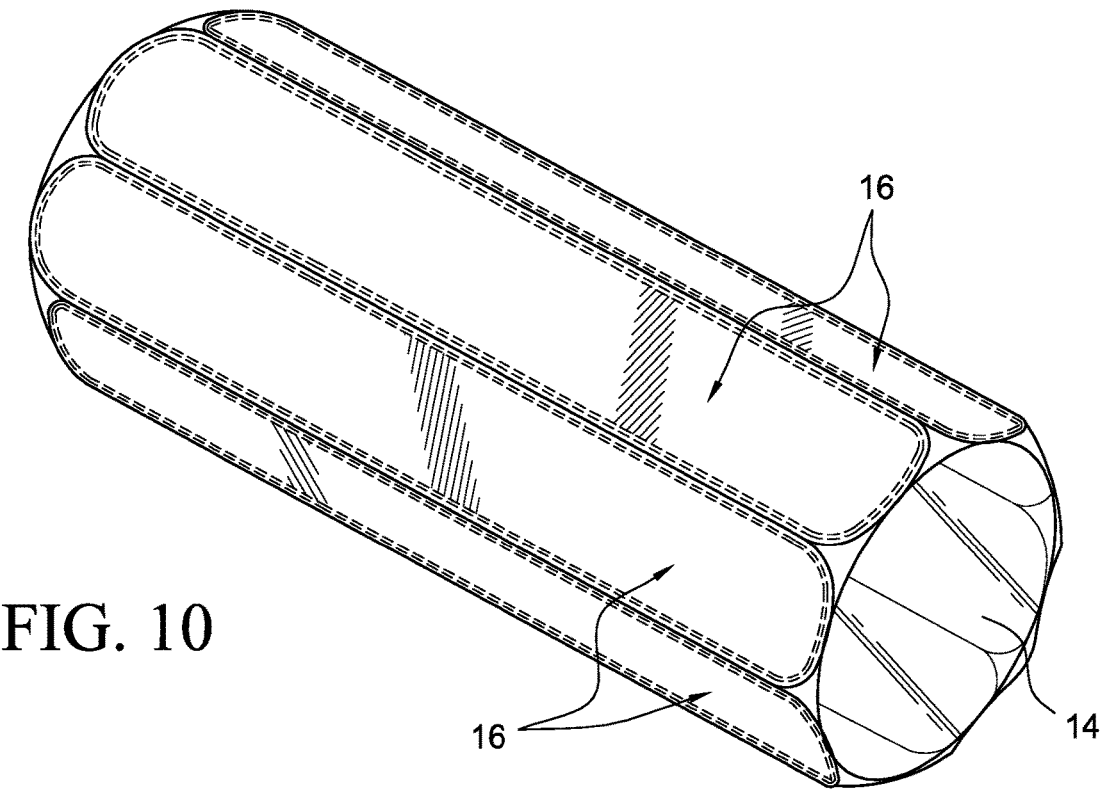
FIG. 10 is a perspective view of the hand-held emergency vision device showing a hexagonal cross-sectional.

Referring to FIG. 10, the housing 6 may be made of different number of wall panels 16, such as 3, 6, 8, or more, even or odd numbered. The wall panels 16 may be of different sizes to facilitate folding. The wall panels 16 The housing may also be tapered, similar to FIG. 9.

Figure 11:
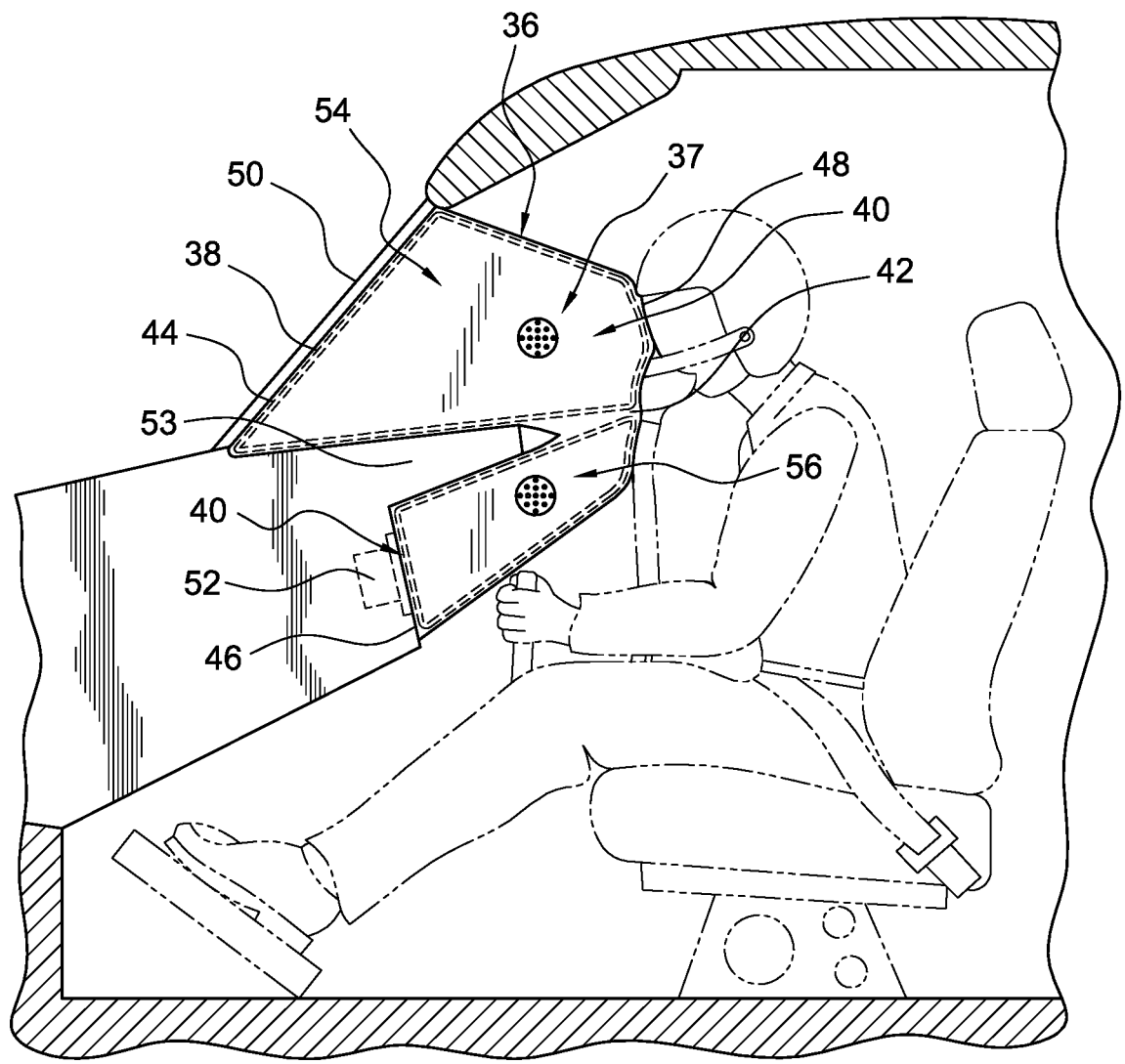
FIG. 11 a schematic side elevational view of a cockpit showing a pilot using an emergency vision device embodying the present invention.

Referring to FIG. 11, an emergency vision device 36 is disclosed. The device 36 includes an enclosed housing 37 having front ends 38 and 40 and rear end 42 provided with respective clear members 44, 46 and 48. The housing 37 is air-tight to keep air inside and particulates of smoke outside. The device 36 advantageously allows the user to see the outside through the windshield 50 and the instrument panel 52 through the clear members 44, 46 and 48. Once deployed, the device 36 is stationary. The housing 37 may be detachably attached to the glareshield 53 and the front face of instrument panel 52 with VELCRO fasteners or other detachable fasteners.

Referring to FIG. 12, the housing 37 includes windshield section 54 and an instrument section 56. Each section 54 and 56 may communicate or completely sealed from each other. When in communication, air from one section may pass to the other section to help in the deployment. When sealed from each other, air from one section stays within that section and each section is expanded independently of the other section. Each of the sections 54 and 56 is made of a wall panel 58, made according to the wall panel 16 with the peripheral sleeve 20 and the looped spring wire 22. As in the device 2, a minimum of two wall panels 58 adjacent to each other for each of the sections 54 and 56, may be provided with the loops of spring wire 22. Once the device 36 is expanded, the air inside the housing 37 and the two spring wires 22 in each section will provide enough support and rigidity to the housing 37. The device 36 will advantageously be easier to fold when less number (as compared to all the wall panels 58 being provided with loops of spring wire) of loops of spring wire 22 are used.

FIG. 12 shows three loops of spring wire 22 in each section. The bottom wall panel of the windshield section 54 and the top wall panel of the instrument panel section 56 are not provided with the spring wire 22. However, each of the four wall panels 58 of each section may be provided with a loop of spring wire 22 for added structural support.

The housing 37 is advantageously self-supporting, without the need of inflation from a blower, thereby having unlimited deployment time during a smoke emergency. The individual wall panels 58 are self-supporting by means of the looped spring wire 22 that pulls and stretches the material of the wall panel 58 outwardly and the air inside the housing. The wall panels 58 may be made of clear material to allow additional light inside the housing 37.

Filters 60 are provided for relatively rapid unfolding of the housing 37 from the compact form to the expanded form. One, two or more filters 60 may be provided strategically around the housing 37 for rapid unfolding when deployed during an emergency. The wall panel 58, as disclosed in FIG. 7, may also be made of filter fabric material, in lieu of the cartridges for the filters 60, that allows air to pass into the interior of the housing 37 but blocks particulate matter in the smoke from entering. Instead of the entire wall panel 58 being made of filter fabric material, only a portion of the wall panel may be made of the filter fabric material, as shown in FIGS. 13 and 14.

The device 36 has an expanded form, as shown in FIGS. 11 and 12 and may be folded flat into a compact form in a manner similar to that shown FIG. 4-6. The housing 37 is advantageously made of foldable material, including the wall panels 58 and the clear members 44, 46 and 48, to allow folding into a compact form when not in use. The windshield section 54 may be folded flat. The instrument panel section 56 may also be folded flat unto the flattened section 56. The two flattened sections 54 and 56 may then be twisted and folded unto each other to make a smaller size, similar to FIGS. 5 and 6. The foldable material may be made of Nylon, plastic or other suitable foldable material that is air-tight that will hold air inside the housing 6 and a good barrier to smoke particles to keep smoke out.

Although the device 36 is shown as a single housing 37 having the windshield section 54 and the instrument panel section 56 connected together, it should be understood that the windshield section 54 and the instrument panel section 56 may also be made as separate units 55 and 57, generally separated along the line 61, each unit having their respective individual clear members 47 and 49. Each of the units 55 and 57 will be like the device 2, but configured in the respective shapes of the units 55 and 57. Each of the separate units 55 and 57 will function the same as before, providing visibility to the user to the windshield 50 and the instrument panel 52 during a smoke emergency. During use, the separate windshield unit 55 can be attached to the separate instrument panel unit 57 to form one unit in the configuration shown in FIGS. 11 and 12, using VELCRO fasteners 63 or other similar removable fasteners. The joined units 55 and 57 are fixed in place during use, unlike the device 2, which is movable by the user to view other sources of information. The units 55 and 57 may also be mounted separately with respect to the windshield 50 and the instrument panel 50.

Referring to FIGS. 13 and 14, the device 2 is modified with a clear member 62 on the wall panel 16 and a clear pocket 64 on the opposite wall panel 66. The pocket 64 is preferably made of two overlying clear members 68 and 70 with an opening 72. A computer tablet, or a card containing a checklist or other source of information required by the operator may be placed inside the pocket 64 and viewed through the opposite clear member 62 or any of the wall panels 16 when made with clear material during a smoke emergency. The computer tablet or source of information placed inside the pocket 64 may also be viewed through the clear member 14. The clear members 62, 68 and 70 are preferably made of foldable clear plastic sheet material. The clear member 68 may be opaque or translucent without detracting from the visibility of the computer tablet inside the pocket from other wall panels or the clear member 14. The pocket 64 may also be provided on the other side panels of the housing 6, as needed. The wall panels 16 and 66 may be made of clear material to advantageously allow additional light into the interior of the housing 6 to aid in viewing the source of information by the operator.

Handle straps 74 are operably attached to the respective wall panels 16 at the distal end of the housing 6 from the user. The user's left or right hand may be advantageously slipped into one of the straps 74 using use.

Filters 78 made of a filter fabric material, such as HEPA filter fabric, are operably attached to the wall panels 16. Use of the filter fabric instead of a bulky filter cartridge advantageously provides for a more compact configuration when the housing 6 is folded for stowage.

Fastener straps 80 are disposed on two opposite edges of the wall panel 66 to keep the device 2 in the folded position. Attachment tabs 82 are disposed on the wall panel 66. Tabs 84 are disposed on an edge 86 of the wall panel 16 to advantageously assist in the unfolding of the device 2 during deployment.

Figure 15:
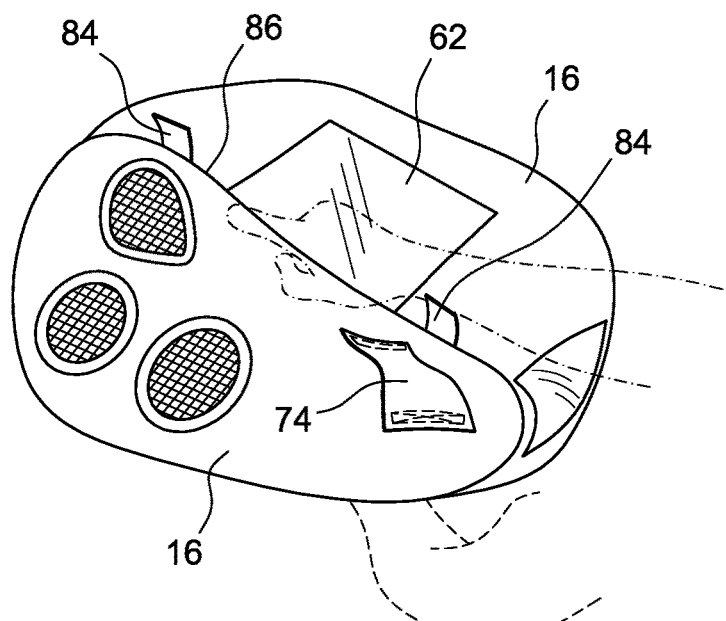
FIGS. 15-23 are perspective views of the device of FIG. 13 shown in various stages of being folded.
Figure 16:
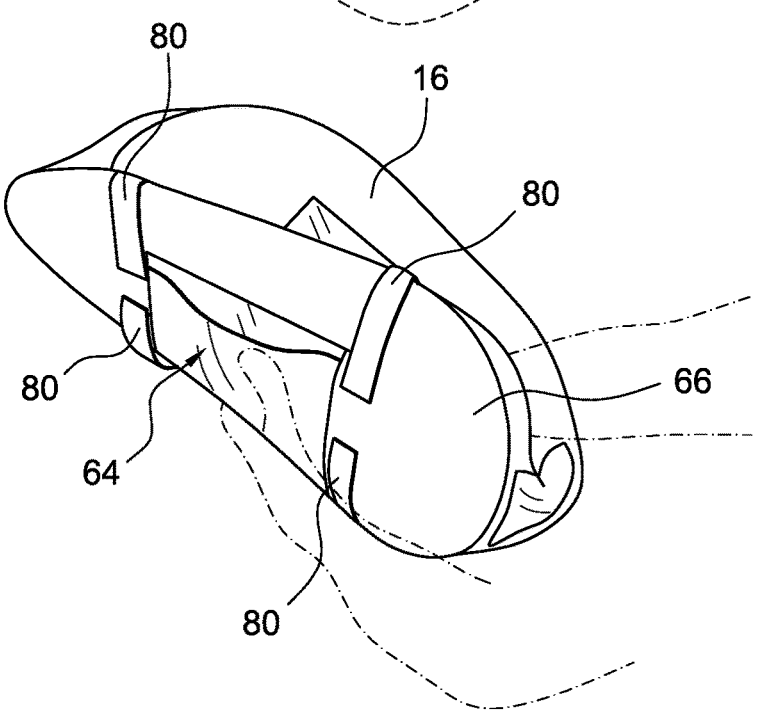
Figure 17:
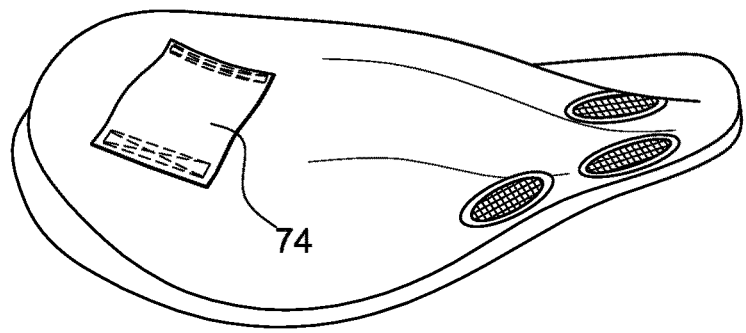

Referring to FIG. 15, the device 2 is collapsed by pushing down along the edge 86 toward the opposite edge 88 (see FIG. 13). Referring to FIG. 16, the side panels 16 attached to the edge 86 collapse toward the respective panels 16 and 66 attached to the edge 88. Referring to FIG. 17, the device 2 is shown flat.

Figure 18:
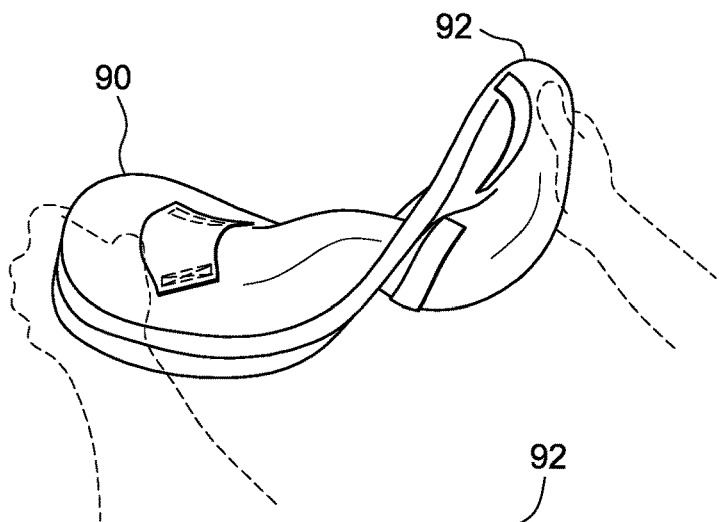
Figure 19:
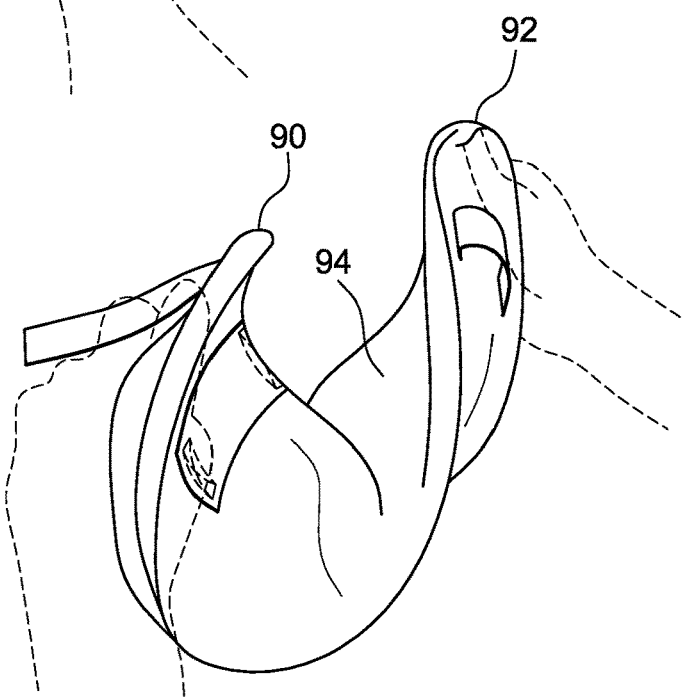
Figure 20:
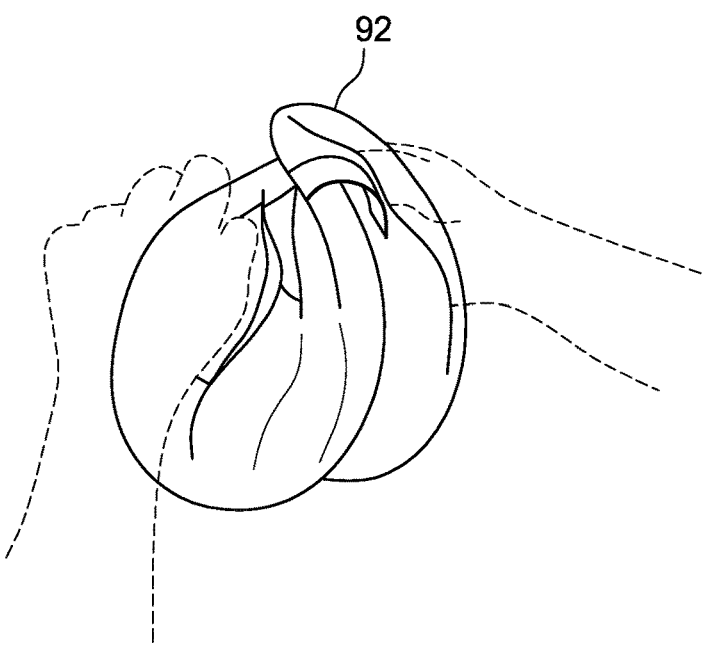

Referring to FIG. 18, the flattened device 2 is held at opposite ends 90 and 92. Referring to FIG. 19, the ends 92 and the 90 are twisted away and toward the user, respectively, while at the same time folding the end 90 into the section 94. Referring to FIG. 20, the device is compacted to about a third of the size shown in FIG. 17. The compacted device 2 may then be placed in a pouch or container to keep it compacted for storage. The strap 28 may also be used to hold the device 2 in the flattened, compacted state.

Figure 21:
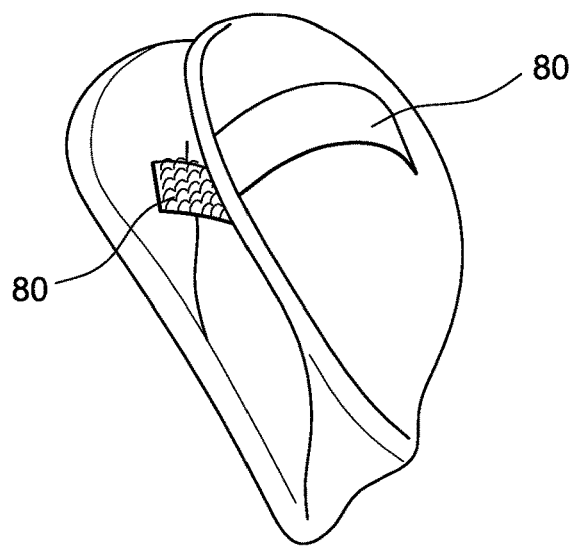
Figure 22:
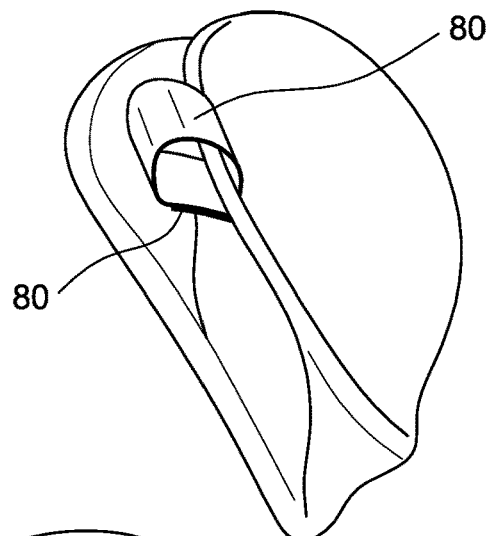
Figure 23:
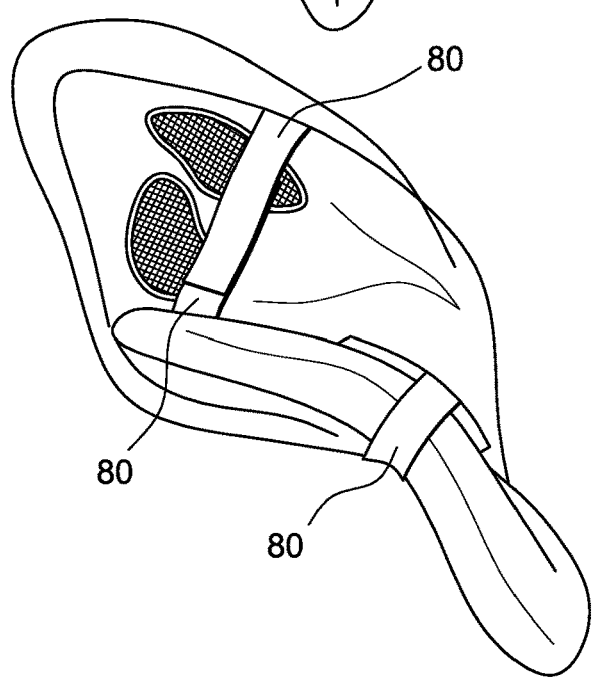

Referring to FIGS. 21 and 22, the fastener straps 80 may be used to control the deployment of the device 2. The fastener straps 80 become adjacent to their respective diagonally disposed fastener straps (see FIG. 14), as shown in FIG. 21 and are attached to each other, as shown in FIG. 22. When the flattened and compacted device 2 is released from the strap 28 or pouch, the device 2 springs to a twisted configuration as shown in FIG. 23. The fastener straps 80 are then released from each other and the tabs 84 pulled out to assist in the expansion of the device 2. Air from the environment will be drawn through the filters 78, trapping smoke or particulate matter from the smoke in the cockpit during a smoke emergency, allowing clear air to fill the interior of the device 2.

It seen from the foregoing description that the devices 2 and 36 enable an operator to maintain visual contact with instruments or other visual sources of data after vision-obscuring matter, such as smoke and/or particulate matter from a fire, has invaded the operator's environment. In particular, the device 36 provides a clear view outside the windshield and of the instrument panel in an aircraft cockpit, thereby providing the pilot with vital information for guiding the aircraft to a safe landing after such as smoke or other vision-obscuring matter, invades the cockpit area.

Although the devices 2 and 36 shown in the context of an aircraft cockpit, the invention can be used in other similar environments where an operator in a station requires access to information from a source, such as an instrument panel, during a vision-obscuring emergency, such as a smoke generating event. Examples of operator stations are a submarine control station, a nuclear power plant control room, an oil rig or any other critical or military environments where the need exists for an operator to continue to operate in case of a vision-obscuring emergency, such as when smoke or other particulate matter invades the operator station and obliterates the visibility between the operator and the control panel. Accordingly, where the instruments, control panel or critical sources of information are disposed in an operator station, the operator must have visual access to the information in case a vision-obscuring event occurs in the operator station.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An emergency vision device, comprising:
   a) an enclosed first housing having a first end and a second end;

b) first and second clear members disposed at the first and second ends, respectively;
c) the first housing including a plurality of wall panels joined side-to-side, the wall panels being foldable; and
d) a loop of spring wire is operably associated with each of at least two of the wall panels.

2. The emergency vision device as in claim 1, wherein:
a) each of the at least two of the wall panels includes a peripheral edge;
b) a sleeve disposed along the peripheral edge; and
c) the loop of spring wire is disposed inside the sleeve.

3. The emergency vision device as in claim 1, wherein:
a) the first housing is collapsible with an expanded form and a compact form; and
b) a filter operably associated with the first housing to filter the ambient atmosphere and fill the interior of the first housing when the first housing is expanded to the expanded form.

4. The emergency vision device as in claim 1, wherein the first housing is tubular.

5. The emergency vision device as in claim 4, wherein the first housing is tapered.

6. The emergency vision device as in claim 1, wherein the first housing has four wall panels.

7. The emergency vision device as in claim 1, wherein the first and second clear members are rigid.

8. The emergency vision device as in claim 1, wherein one of the wall panels is made of filter material.

9. The emergency vision device as in claim 1, wherein a portion of one of the wall panels is made of filter material.

10. The emergency vision device as in claim 1, wherein one of the wall panels is clear.

11. The emergency vision device as in claim 10, wherein:
a) one of the wall panels includes a clear member; and
b) a pocket operably attached to the ckear member of the one of the wall panels.

12. The emergency vision device as in claim 1, wherein handle straps are disposed at a distal end of the first housing from a user.

13. The emergency vision device as in claim 1, wherein the first end is conformable to a windshield of a cockpit.

14. The emergency vision device as in claim 1, wherein the first end is conformable to a front face of an instrument panel.

15. The emergency vision device as in claim 1, wherein the first housing is hand-held.

16. The emergency vision device as in claim 1, and further comprising:
a) an enclosed second housing having a third end and a fourth end;
b) third and fourth clear members disposed at the third and fourth ends, respectively;
c) the second housing including a plurality of wall panels joined side-to-side, the wall panels being foldable;
d) a loop of spring wire is operably associated with each of at least two of the wall panels of the second housing;
e) the first housing is disposed above the second housing;
f) the first end is conformable to a windshield of a cockpit; and
g) the third end is conformable to a front face of an instrument panel.

17. An emergency vision device, comprising:
a) an enclosed housing having a first front end, a second front end and rear end;
b) first and second clear members disposed at the first and second front ends, respectively, and a third clear member disposed at the rear end;
c) the housing including a first section operably associated with the first and third clear member to allow the user to see outside through a windshield;
d) the housing including a second section operably associated with the second and third clear members to allow the user to view an instrument panel;
e) the first section and the second section each including a plurality of wall panels joined side-to-side; and
f) a loop of spring wire is operably associated with each of at least two of the wall panels of the respective first section and the second section.

18. The emergency vision device as in claim 17, wherein:
a) each of the at least two of the wall panels includes a peripheral edge;
b) a sleeve disposed along the peripheral edge; and
c) the loop of spring wire is disposed inside the sleeve.

19. The emergency vision device as in claim 17, wherein the wall panels are foldable.

20. The emergency vision device as in claim 17, wherein:
a) the housing is collapsible with an expanded form and a compact form; and
b) a filter is operably associated with the housing to filter the ambient atmosphere and fill the interior of the housing when the housing is expanded to the expanded form.

21. The emergency vision device as in claim 17, wherein one of the wall panels is made of filter fabric material.

22. The emergency vision device as in claim 17, wherein a portion of one of the wall panels is made of filter fabric material.

* * * * *